United States Patent [19]
Dane

[11] 3,849,668
[45] Nov. 19, 1974

[54] ORTHOTIC ARM JOINT
[75] Inventor: Dan H. Dane, Huntsville, Ala.
[73] Assignee: The United States of America as represented by the Administrator of the National Aeronautics and Space Administration, Washington, D.C.
[22] Filed: Oct. 4, 1973
[21] Appl. No.: 403,694

[52] U.S. Cl. ............ 307/149, 214/1 CM, 308/174
[51] Int. Cl. ............................................. B25j 3/00
[58] Field of Search .... 128/77; 307/149; 214/1 CM; 74/425; 308/174

[56] References Cited
UNITED STATES PATENTS
2,858,947  11/1958  Chapman .................... 214/1 CM Primary Examiner—Robert K. Schaefer
Assistant Examiner—M. Ginsburg
Attorney, Agent, or Firm—Wayland H. Riggins; L. D. Wofford, Jr.; John R. Manning

[57] ABSTRACT

An improved orthopedic (orthotic) arm joint that can be used in various joints of mechanical arms. The arm joint includes a worm, which is coupled to an electric motor for rotating a worm gear carried within a rotatable housing. The worm gear is supported on a thrust bearing and the rotatable housing is supported on a radial thrust bearing. A bolt extends through the housing, bearings, and worm gear for securing the device together. A potentiometer extends through the bolt, and is coupled to the rotatable housing for rotating therewith, so as to produce an electrical signal indicating the angular position of the rotatable housing.

6 Claims, 4 Drawing Figures

ORTHOTIC ARM JOINT

ORIGIN OF THE INVENTION

The invention described herein was made by an employee of the United States Government, and may be manufactured and used by or for the Government for governmental purposes without the payment of any royalties thereon or therefor.

BACKGROUND OF THE INVENTION

This invention relates to an orthotic arm joint, and more particularly to an arm joint which can be accurately rotated for manipulating various objects.

Joints have been utilized in mechanical arms for providing movement of the arm responsive to electrical signals. These joints have generally been limited in the amount of stress that can be applied thereto. The joints have been used in space exploration wherein, a master mechanical arm located on earth is used for manipulating a similar arm located on the moon or in space vehicles. By sending electrical signals from the master arm the mechanical arm located at the remote station can be manipulated to perform various functions, such as collecting and testing soil samples, etc. As these tests have been performed the importance of developing mechanical devices that are capable of doing ordinary work using screw drivers, drills, soldering irons, etc., have become apparent. In order to perform the desired work the operation of the mechanical joints must be very accurate. The mechanical joint constructed in accordance with the present invention has been utilized in orthopedic arm joints used by patients who are completely paralyzed except for movement of their head and tongue. The patients, by use of their tongues, have been able to manipulate the mechanical arms equipped with the novel joint so as to perform functions, such as writing, feeding themselves, and other tasks normal to persons not paralyzed.

SUMMARY OF THE INVENTION

The invention comprises a joint for use in mechanical arms mounted in a fixed housing. A worm gear supported on a thrust bearing is carried within the fixed housing, and has a spacer positioned adjacent thereto. Positioned on the opposite side of the paper is a radial thrust bearing having an inner race and an outer race. A bolt having a shank portion extends through the radial thrust bearing, the spacer, the worm gear, and the thrust bearing for engaging the fixed housing. A rotatable housing is supported on an outer race of the radial thrust bearing, and has an inner end fixed to the worm gear for rotating therewith. An outwardly extending arm is coupled to the rotatable housing. An electric motor is used for rotating the worm gear responsive to being energized so that the arm can be manipulated by selectively energizing the electric motor. A potentiometer is mounted within the rotatable housing for generating an electrical signal indicating the angular position of the rotatable housing relative to the fixed housing.

Accordingly, it is a general object of the present invention to provide an improved orthotic arm joint.

Another important object of the present invention is to provide a joint that can be accurately manipulated and utilized in mechanical systems to perform work which requires considerable load.

Still another important object of the present invention is to provide a mechanical joint which will sustain substantial bending forces.

Still another important object of the present invention is to provide a relatively simple and maintenance free joint that can be manipulated by use of electrical signals.

These and other object and advantages of the invention will become apparent upon reference to the following specification, attendant claims and drawings.

DESCRIPTION OF THE PREFERRED EMBODIMENT

Figure 1:
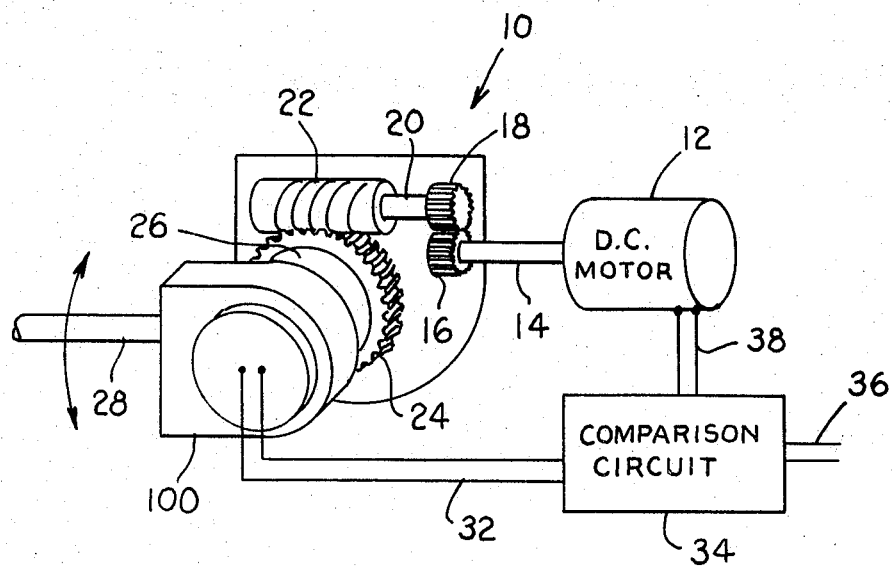
FIG. 1 is a schematic block diagram of an arm joint constructed in accordance with the present invention located within a circuit that can be used in remote control systems.

Referring to FIG. 1 of the drawings there is illustrated an arm joint generally designated by the reference character 10. The arm joint is under control of an electric motor 12 which drives an output shaft 14. Positioned on the end of the output shaft is a gear 16 which meshes with a gear 18 carried on a shaft 20 upon which a worm 22 is mounted. The worm 22 engages a worm gear 24 forming part of the arm joint which in turn is used for rotating an outer housing 26 for manipulating an outwardly extending arm 28. A potentiometer 30 is carried within the rotatable housing 26 and generates an electrical signal which is fed over leads 32 for indicating the angular position of the arm 28.

When the joint is being used in a master-slave system the signals being generated by the potentiometer 30 are fed into a comparison circuit 34 for being compared with electrical signals coming in on leads 36 from the master system. The comparison circuit 34, which can be any suitable conventional comparison circuit, generates an error signal which is fed through leads 38 to the D.C. motor for causing the motor to rotate the shaft 14 a certain angular distance. Such, in turn, causes the arm 28 to rotate to the desired position.

Figure 2:
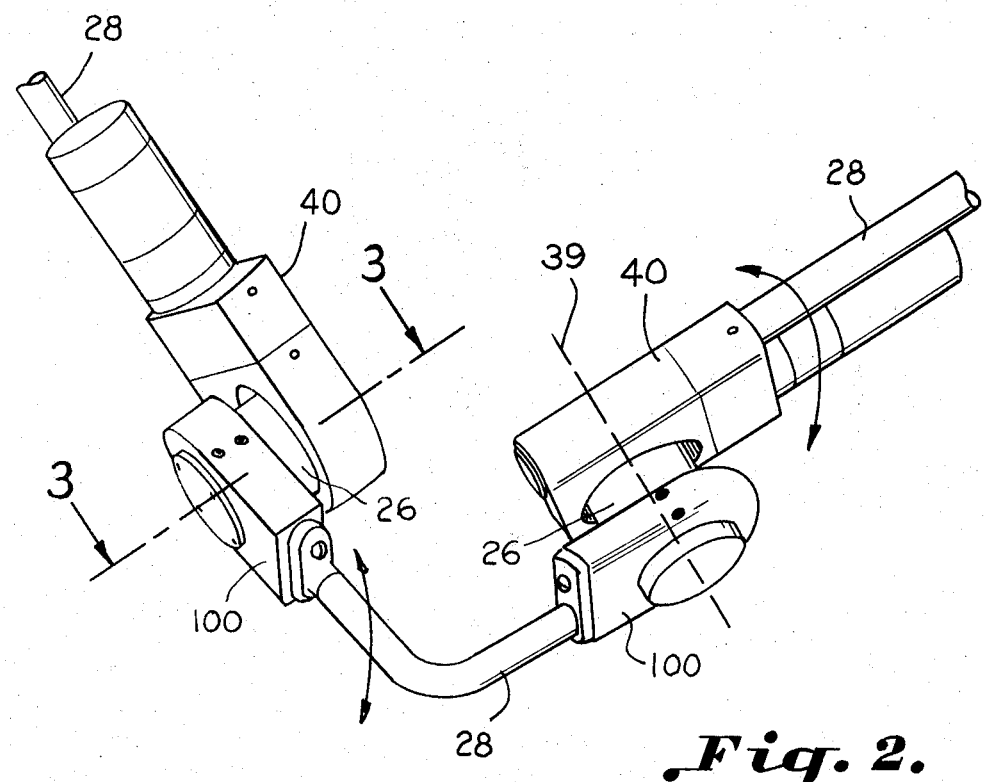
FIG. 2 is a perspective view showing a pair of arm joints mounted to provide movement in two different directions.

When it is desired to provide movement in more than one direction, two of the joints may be coupled together, such as illustrated in FIG. 2. Normally, such a coupling is provided when it is desired to simulate the movement inherent in a shoulder joint. The joint shown on the right in FIG. 2 permits rotation about an axis 39, whereas, the joint shown on the left permits rotation about an axis corresponding to the line 3—3 in FIG. 2.

Figure 3:
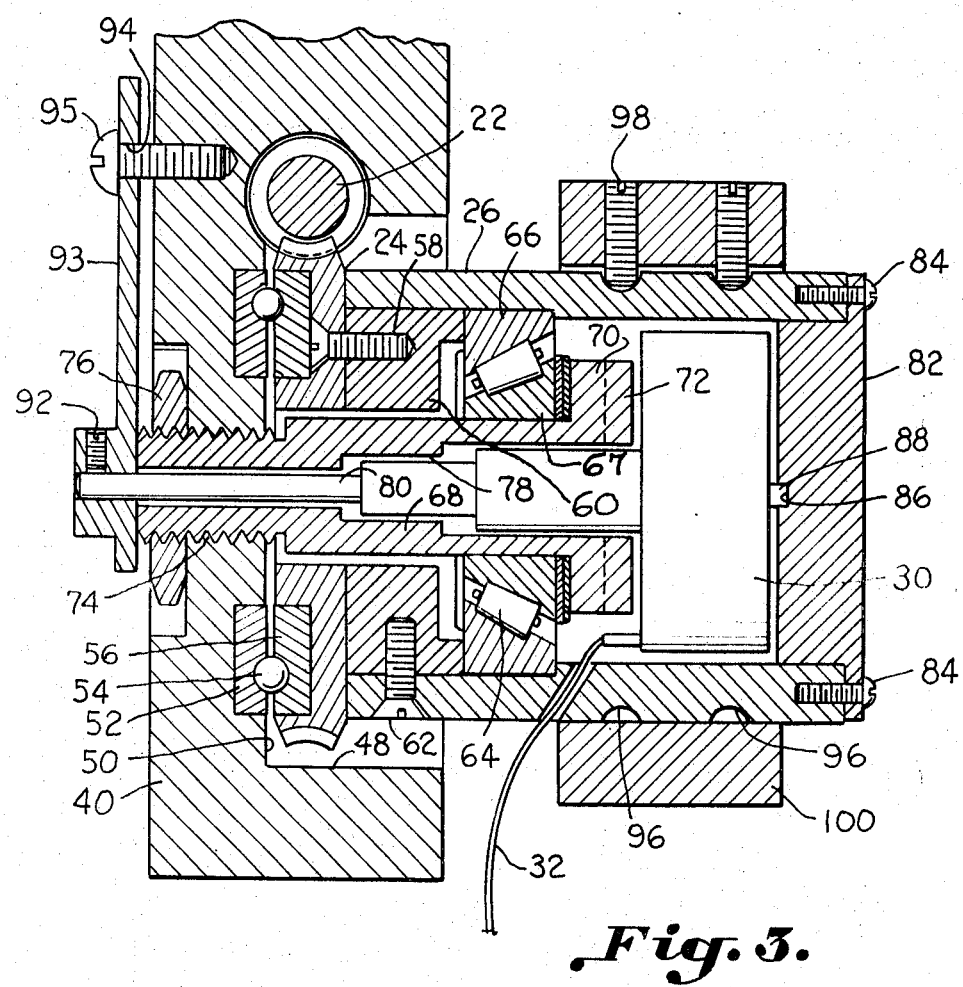
FIG. 3 is a sectional view taken along line 3—3 of FIG. 2 illustrating the details of an arm joint constructed in accordance with the present invention.
Figure 4:
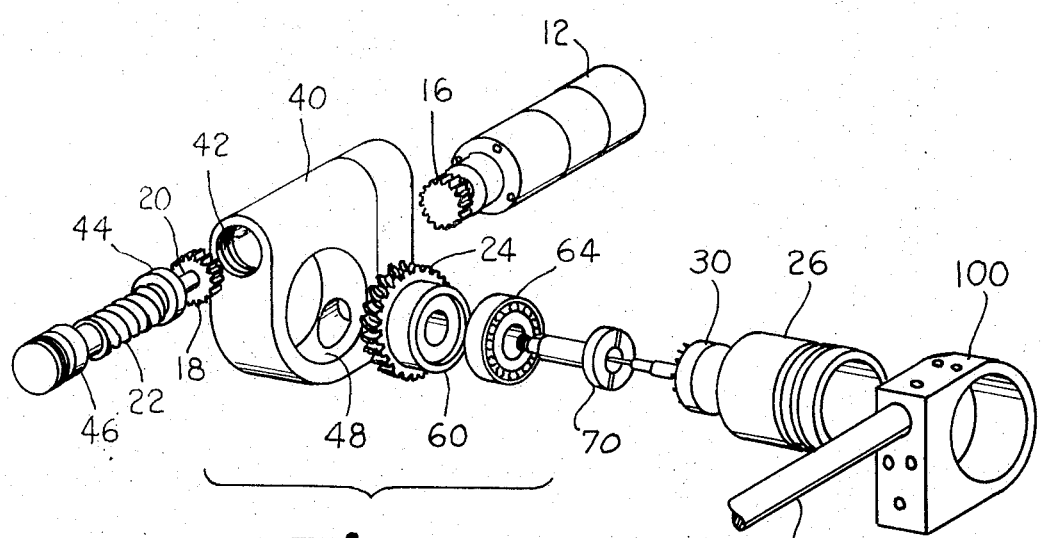
FIG. 4 is a perspective exploded view of an arm joint constructed in accordance with the present invention.

Referring in more detail to FIGS. 3 and 4 of the drawings, a fixed housing 40 constructed of any suitable metallic material, has a hole (not shown) provided for receiving the gear 16 carried on the end of the shaft 14 of the D.C. motor 12.

Another longitudinal bore 42 is provided for receiving shaft 20 upon which worm 22 is carried. The gear 18, which is carried on the end of the shaft 20, meshes with gear 16 carried on the end of the shaft 14 so that the D.C. motor 12 can rotate the worm 22. Suitable bearings 44 and 46 are provided for rotatably supporting the shaft 20 within the bore 42.

The housing 40 has an enlarged recess 48 provided therein. The recess 48 terminates in a rear wall 50. A groove is provided in the rear wall 50 for receiving an inner race 52 of a thrust ball bearing 54. An outer race 56 of the thrust bearing 54 is suitably carried within the circular groove provided in the face of the worm gear 24. Positioned on the other side of the worm gear 24, and attached thereto by screws 58, is a spacer 60. The spacer 60 is, in turn, secured to the cylindrically shaped rotatable housing 26 by means of screws 62. Flush against an outer edge of the spacer 60 is a radial thrust bearing 64 which has an outer race 66 engaging an inner wall of the rotatable housing. An inner race 67 is supported on a shank portion 68 of an elongated bolt 70. The bolt 70 has an enlarged head 72 which abuts against the radial thrust bearing 64 with the shank portion 68 extending therefrom through the radial thrust bearing 64, the spacer 60, the worm gear 24, and a bore 74 provided in the wall 50 of the fixed housing 40. The bore 74 has threads therein for engaging threads carried on the outer end of the shank portion of the bolt 70. A lock-nut 76 is threaded on the end of the bolt 70 for fixing the bolt to the housing 40.

An elongated bore 78 extends longitudinally through the bolt 70 for receiving a shank portion 80 of the potentiometer 30.

A cap 82 is secured to the outer end of the cylindrical rotatable housing 26 by means of screws 84. A groove 86 is provided in the inner surface of the cap 82 for receiving an elongated ridge 88 carried on an enlarged head of the potentiometer 30 so as to permit the head of the potentiometer 30 to be rotated with the rotatable housing 26. Wires 32 coming from the enlarged head of the potentiometer 30 extend through an opening in the rotatable housing 26 so that such can be attached to a suitable voltage source and output device. When the enlarged head of the potentiometer is rotated relative to the shank portion 80 thereof, such varies the output signal of the potentiometer. The setting of the potentiometer may be adjusted by rotating an external arm 93, which is connected by a setscrew 92, to the shank portion 80 of the potentiometer. The arm 93 has an arcuate slot 94 therein, of approximately 90 angular degrees through which a bolt 95 extends. The inner end of the bolt 95 threadably engages the fixed housing 40. By unscrewing the bolt and rotating the arm 93 a predetermined number of degrees the potentiometer 30 can be adjusted.

The rotatable housing 26 has grooves 96 provided therein for receiving an inner end of nylon setscrews 98. The nylon setscrews 98 are threaded through holes provided in a collar 100 which extends around the rotatable housing.

The reason that nylon setscrews are utilized for securing the collar 100 to the rotatable housing 26 is to prevent damaging the joint if too great a load is applied to the outwardly extending arm 28 carried by the collar 100. When the load exceeds a predetermined force the nylon screws permit the collar 100 to slip on the rotatable housing 26.

It is noted that the inner race 67 of the radial thrust bearing 64 is supported on the shank portion 68 of the bolt 70 so as to permit the rotatable housing 26 to rotate freely relative to the bolt.

In summarizing the operation of the joint, when an electrical signal is applied to the D.C. motor 12 such causes the shaft 14 to rotate a predetermined number of degrees. The rotation of the shaft 14, in turn, causes the worm 22 to be rotated. The rotation of the worm 22 causes the worm gear 24 to be rotated. When the worm gear 24 is rotated the housing 26 is rotated therewith. The arm 28 carried by the collar 100, which is attached to the housing 26, is also rotated a predetermined number of degrees. Thus, it can be seen that by selectively energizing the electric motor 12 the arm 28 can be manipulated. It is noted that when the housing 26 is rotated the enlarged head portion of the potentiometer is rotated therewith relative to the shank portion 80. This causes an electrical signal to be fed out over the wires 32 indicating the angular position of the arm 28. Therefore, by comparing the electrical signal produced by the potentiometer 30 with signals produced by a potentiometer carried in a master arm corrective signals can be applied to the motor 12 so that the arm 28 is in the same position as the arm carried by a master unit.

By utilizing a radial thrust bearing 64 spaced from a thrust bearing 54, as shown in FIG. 3, the arm joint is more capable of handling bending forces applied thereto. When the joint is used in an orthopedic arm it is not necessary to utilize the potentiometer 30, since the position of the devices attached to the arm 28 can be physically observed, rather than relying on an electrical signal for indicating the angular position thereof.

While a preferred embodiment of the invention has been described using specific terms, such description is for illustrative purposes only, and it is to be understood that changes and variations may be made without departing from the spirit or scope of the following claims.

What is claimed is:

1. A joint for use in a mechanical arm comprising:
   a. a fixed housing;
   b. a thrust bearing including an inner race connected to said fixed housing and an outer race;
   c. a worm gear;
   d. said outer race being carried in said worm gear;
   e. a spacer connected to said worm gear on an opposite side from said thrust bearing;
   f. a radial thrust bearing having an inner race and outer race;
   g. a bolt having a shank portion extending through said inner race of said radial thrust bearing, said spacer, said worm gear and said thrust bearing for engaging said fixed housing;
   h. a rotatable housing supported on said outer race of said radial thrust bearing having an inner end fixed to said worm gear;
   i. an outwardly extending arm coupled to said rotatable housing; and
   j. an electric motor having a shaft coupled to said worm gear for rotating said worm gear responsive to being energized,
   k. whereby said arm is manipulated by selectively energizing said electric motor for driving said worm gear which in turn rotates said rotatable housing.

2. The joint set forth in claim 1 further comprising:

a. a potentiometer enclosed in said rotatable housing;

b. means for supplying electrical voltage to said potentiometer;

c. said potentiometer having a movable element attached to said rotatable housing for rotating therewith for varying the voltage output thereof, and d. a shank portion of said potentiometer coupled to said fixed housing;

whereby when said rotatable housing is rotated the angular position thereof can be determined by the output voltage from said potentiometer.

3. The joint as set forth in claim 1 further, comprising:

a. circumferential grooves carried on an outer surface of said rotatable housing;

b. a collar carried on said rotatable housing having threaded holes extending therethrough in alignment with said circumferential grooves;

c. nylon setscrews extending through said holes in said collar into said grooves in said rotatable housing for locking said collar relative to said rotatable housing; and d. said arm being mounted on said collar so that when a force is applied to said arm greater than a predetermined value, said setscrews permit said collar to slip on said rotatable housing minimizing damage to said joint.

4. The joint as set forth in claim 1, wherein said inner race of said radial thrust bearing is supported on said shank portion of said bolt.

5. The joint as set forth in claim 2 wherein:

a. said bolt has an elongated axial bore extending therethrough; and b. said shank portion of said potentiometer extending through said elongated axial bore for engaging said fixed housing.

6. The joint as set forth in claim 3 wherein:

a. said electric motor has a rotatable output shaft;

b. a gear carried on said rotatable output shaft;

c. a worm rotatably carried in said fixed housing meshed with said worm gear, and d. said gear rotating said worm responsive to energizing said electric motor.

* * * * *